(12) United States Patent
Hansen

(10) Patent No.: US 8,763,481 B2
(45) Date of Patent: Jul. 1, 2014

(54) RECIPROCATING LEVER TRANSMISSION

(76) Inventor: Gordon Harold Hansen, Tallahassee, FL (US)

(*) Notice: Subject to any disclaimer, the term of this patent is extended or adjusted under 35 U.S.C. 154(b) by 291 days.

(21) Appl. No.: 13/372,043

(22) Filed: Feb. 13, 2012

(65) Prior Publication Data

US 2013/0205928 A1 Aug. 15, 2013

(51) Int. Cl.
*F16H 21/18* (2006.01)

(52) U.S. Cl.
USPC .................................. 74/43; 74/560

(58) Field of Classification Search
USPC .............. 74/37, 42, 43, 47, 561, 560, 562
See application file for complete search history.

(56) References Cited

U.S. PATENT DOCUMENTS

| | | | | |
|---|---|---|---|---|
| 4,124,222 A | * | 11/1978 | Moe et al. | 280/221 |
| 4,182,522 A | * | 1/1980 | Ritchie | 280/278 |
| 4,379,566 A | * | 4/1983 | Titcomb | 280/251 |
| 4,779,882 A | * | 10/1988 | Date | 280/230 |
| 4,795,381 A | * | 1/1989 | Willems | 440/26 |
| 5,242,182 A | * | 9/1993 | Bezerra et al. | 280/253 |
| 5,405,157 A | * | 4/1995 | Bezerra et al. | 280/253 |
| 5,716,069 A | * | 2/1998 | Bezerra et al. | 280/254 |
| 7,111,860 B1 | * | 9/2006 | Grimaldos | 280/253 |
| 8,118,320 B2 | * | 2/2012 | Lee | 280/240 |
| 8,540,265 B2 | * | 9/2013 | Malone | 280/242.1 |

* cited by examiner

*Primary Examiner* — David M Fenstermacher
(74) *Attorney, Agent, or Firm* — J. Wiley Horton

(57) ABSTRACT

A reciprocating pedal transmission for a pedal-powered vehicle. Two pedals are selectively connected to a driveshaft by one way clutches. A reversing gear mechanism forces the non-pushing pedal to travel in a direction which is opposite to the direction of the pushing pedal. The non-pushing pedal may also be used to input force (a pulling force) if desired. The arcuate range of motion is infinitely variable. The user may reverse the pedal travel at any time using only the forces applied by the feet.

20 Claims, 13 Drawing Sheets

RECIPROCATING LEVER TRANSMISSION

CROSS-REFERENCES TO RELATED APPLICATIONS

Not Applicable.

STATEMENT REGARDING FEDERALLY SPONSORED RESEARCH OR DEVELOPMENT

Not Applicable

MICROFICHE APPENDIX

Not Applicable

BACKGROUND OF THE INVENTION

1. Field of the Invention

This invention relates to the field of human-powered vehicles. More specifically, the invention comprises a transmission for converting a reciprocating lever motion into rotary motion.

2. Description of the Related Art

Pedal-powered vehicles have been in common use for over a century. Bicycles are of course the most common, but tricycles and even quadracycles are also well known. The present invention is applicable to any pedal-powered vehicle, as well as any other machine in which a moving lever is used as a power input (including machines in which human arm power is used). The illustrations show the invention's use with a bicycle or tricycle frame, but this should not be viewed as limiting.

FIG. 1 illustrates a prior art pedal mechanism for a bicycle. Most bicycles have a conventional frame including seat tube 14, down tube 16, bottom bracket 12, right chain stay 20, and left chain stay 18. Bottom bracket 12 is a cylindrical housing which is the attachment point for crank mechanism 10. The frame components—including the bottom bracket—are typically welded together.

Left crank 22 and right crank 26 extend outward from a rotational assembly mounted within bottom bracket 12. Left pedal 24 is attached to left crank 22, while right pedal 28 is attached to right crank 26. The two cranks are mounted 180 degrees apart, so that the driving force provided by each of the user's legs is 180 degrees out of phase with the opposing leg.

One or more chain rings 30 are attached to the crank mechanism. These rotate with the pedals. A chain is engaged with one of these chain rings and the chain transmits linear force to the rear drive sprocket. A front selector mechanism moves the chain between the different chain rings 30. A rear selector mechanism moves the chain between the different rear drive sprockets. In combination, the two selector mechanisms determine an overall drive ratio between the pedals and the rear wheel. These features allow a wide range of drive ratios.

The prior art pedal motion is purely rotational. In most instances power is provided only during the "down stroke"—when a pedal is descending through the forward portion of its arc. However, some riders use toe clips to actually attach the shoes to the pedals so that a rider may pull on the pedal during the upward stroke. A strap over the top of the shoe may also be provided for this purpose.

Other prior art designs have used reciprocating pedal motions instead of purely rotational motion. In this approach the pedals travel through an abbreviated arc. The pedals preferably reciprocate so that as one pedal is being pushed down when the other is rising up. In the prior art the user applies force by pushing on the pedal during the down stroke. The opposing pedal is rising to the top of its arc but it is not providing any force input.

Reciprocating pedal designs are comfortable for most users, since the human leg is well adapted to provide a pushing stroke. They work particularly well in recumbent vehicles, where the user has a back rest to push against. However, the prior art reciprocating designs have several drawbacks. First, the return pedal motion (the upward travel in the arc) has previously been provided by a return spring. This spring must be elongated during the down stroke—meaning that the user is expending some effort in simply stretching the spring. Most of this energy is returned when the spring contracts on the upward stroke, but the irreversibilities reduce the overall efficiency.

Second, the prior art reciprocating designs have constrained the arc through which each pedal could travel. It would be better to provide a variable arc length since this would accommodate differing leg lengths, differing abilities, and differing preferences. The present invention provides a reciprocating treadle design which excludes the return spring and allows operation over a variable arc length.

Finally, the prior art designs only allow the user to apply force in the push stroke. The present invention allows force to be applied to both pedals simultaneously—pushing on one and pulling on the other. These differences and advantages will be explained in the following descriptions.

BRIEF SUMMARY OF THE INVENTION

The present invention comprises a reciprocating lever transmission for a pedal-powered vehicle. Two pedals are mounted on the two reciprocating levers. The levers are selectively connected to a driveshaft by one way clutches. A reversing gear mechanism forces the non-pushing pedal to travel in a direction which is opposite to the direction of the pushing pedal. The non-pushing pedal may also be used to input force (a pulling force) if desired. The arcuate range of motion is infinitely variable. The user may reverse the pedal travel at any time using only the forces applied by the feet.

DETAILED DESCRIPTION OF THE INVENTION

Figure 1:
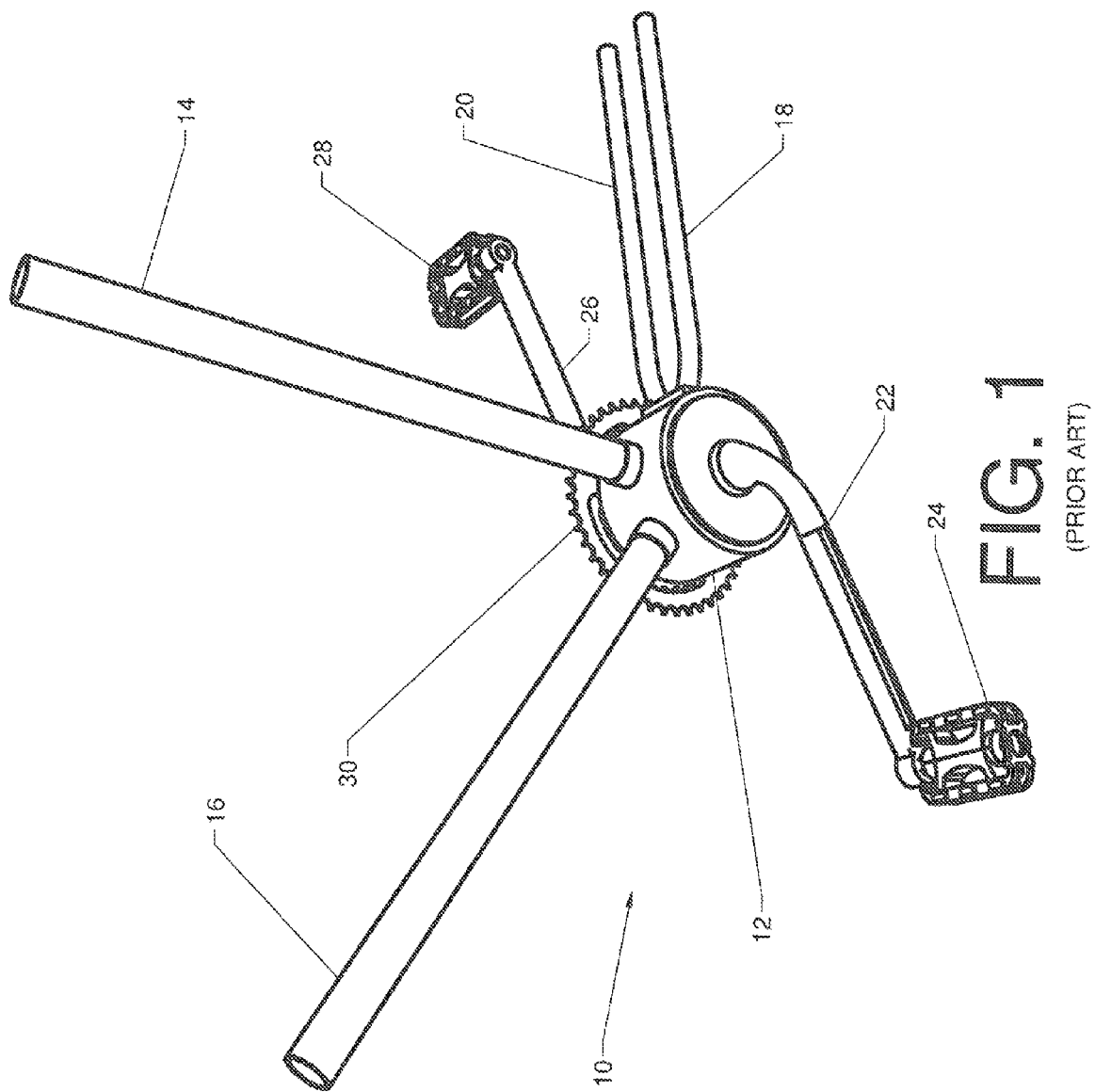
FIG. 1 is a perspective view of a prior art rotary crank mechanism.
Figure 2:
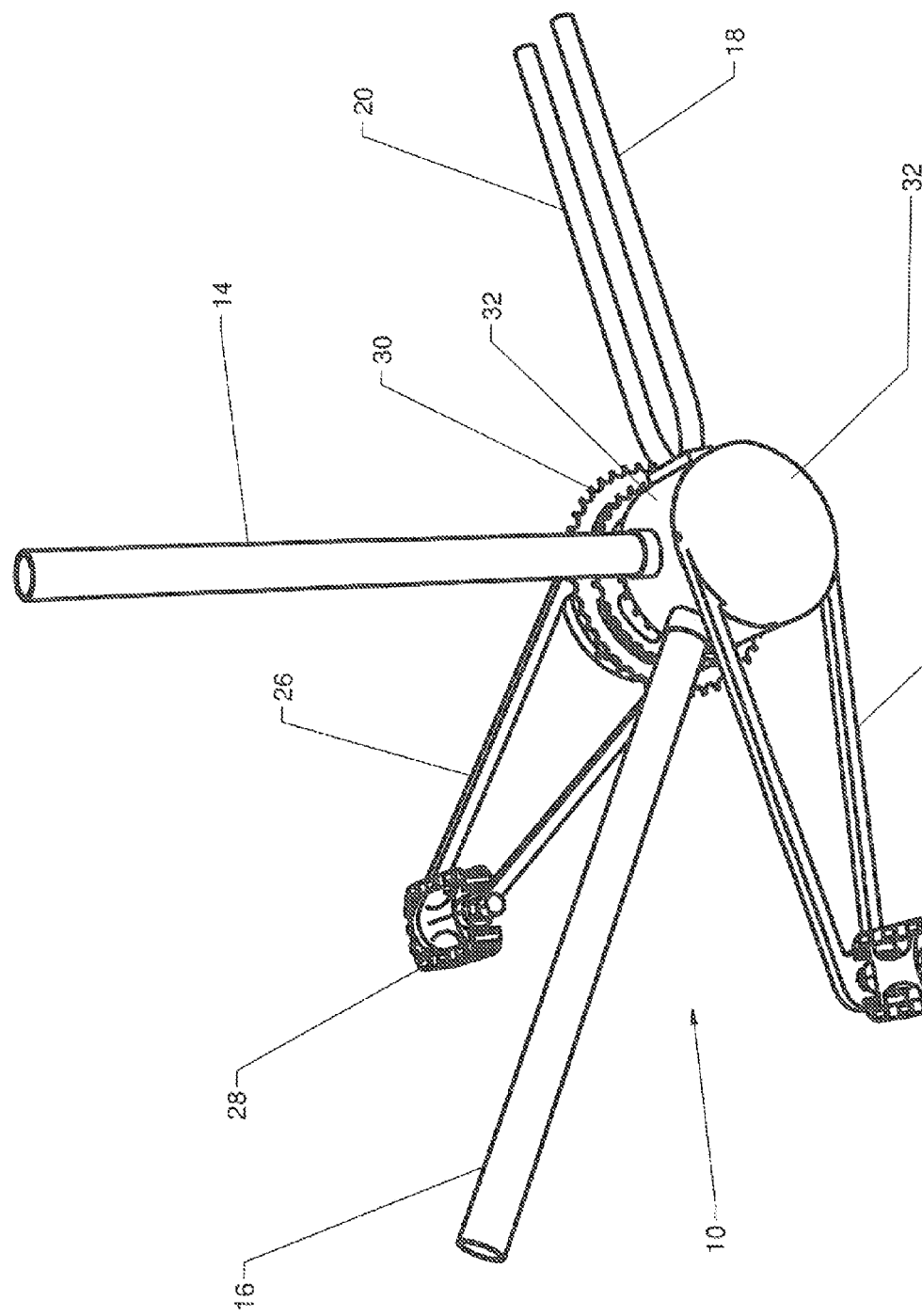
FIG. 2 is a perspective view showing a reciprocating lever mechanism made according to the present invention.

FIG. 2 shows the present invention installed in a lever-powered vehicle—in this case a bicycle. Support housing 32 is attached to a conventional frame which includes down tube 16, seat tube 14, right chain stay 20, and left chain stay 18. In comparing FIG. 2 to FIG. 1, the reader will observe that support housing 32 takes the place of the prior art bottom bracket 12. Left crank 22 and right crank 26 are rotatably connected to support housing 32. The left and right cranks are of course levers. The motion of these two levers provides the power input. However, the term "crank" is used instead of the term "lever" because "crank" is the accepted term within the field of pedal-powered vehicles. Left crank 22 includes a rotatably mounted left pedal 24. Right crank 26 includes a rotatably connected right pedal 28. The two pedals may include toe clips, straps, or other devices allowing the application of a pulling force as well as a pushing one.

The cranks may assume a variety of forms. In the embodiment of FIG. 2, each crank includes a circular hub which is used to rotatably attach it to support housing 32. Two converging arms on each crank attach the hub to the pedal attachment point. In other embodiments only a single arm may be used to connect the hub to the pedal attachment point.

One or more chain rings 30 are connected to crank mechanism 10. These drive a chain which connects the crank mechanism to the rear drive sprocket or sprockets. Conventional mechanisms for transferring the chain from one chain ring to another—thereby changing the drive ratio—are preferably used in conjunction with the inventive crank mechanism. The use of chain rings and a moving chain to transfer power represents the preferred embodiment. However, the present invention may be used with many other types of transfer mechanisms. One additional example is a driveshaft connecting the crank mechanism to the rear wheels. As such components are well known to those skilled in the art, they have not been illustrated or described.

The present invention is a reciprocating lever design. This means that the two cranks do not rotate continuously. Instead, they reciprocate through an arc. The vantage point shown in FIG. 2 is looking from the left side of the bicycle toward the right. The reciprocating design means that when left crank 22 is moving in a counterclockwise direction, right crank 26 is moving in a clockwise direction. The opposite is true as well.

A rider sitting on a seat atop seat tube 14 can provide motive force by stepping downward on right pedal 28. This will cause right crank 26 to move in a counterclockwise direction. The transmission within support housing 32 will cause left crank 22 to move in a clockwise direction. Thus, when the rider steps down on the right pedal the left pedal is rising. Once the right pedal reaches the bottom of its travel, the process is reversed. The left pedal will be in an elevated position at that time. The user then pushes downward on the left pedal and this action will force the right pedal to rise.

The reader will thereby appreciate that the rider can alternately push the right and left pedals in a reciprocating motion. This action is known in prior art "treadle" designs. However, the present invention incorporates several new and desirable features. First, the user can select how large an arc of travel he or she wants to use with each stroke. The user may vary this value infinitely and instantaneously. Second, the user can add power both by pushing on one pedal and pulling on the other pedal. In other words, the present invention can be used with toe clips or straps reaching over the top of the feet. Third, the present invention creates the reciprocating motion without the use of return springs and their associated inefficiencies. In order to understand these new features, the reader must understand some details of the transmission lying within support housing 32.

Figure 3:
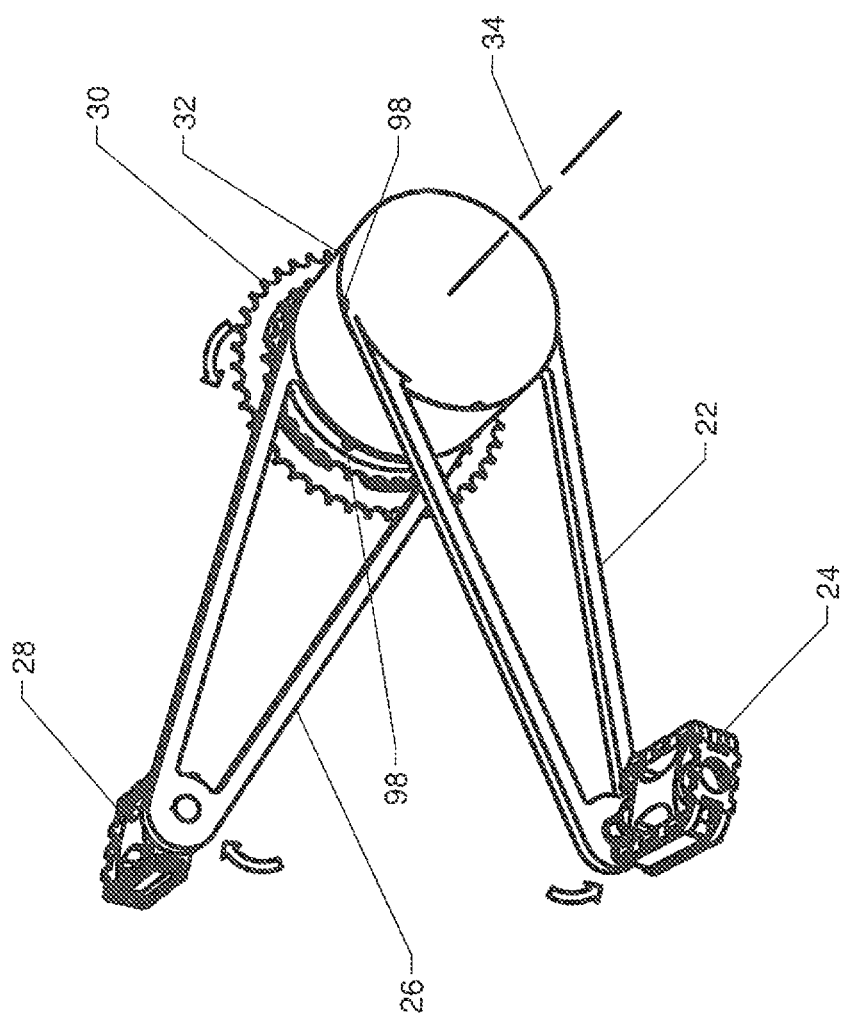
FIG. 3 is a perspective view showing the present invention with the left pedal in the push stroke and the right pedal in the pull stroke.
Figure 4:
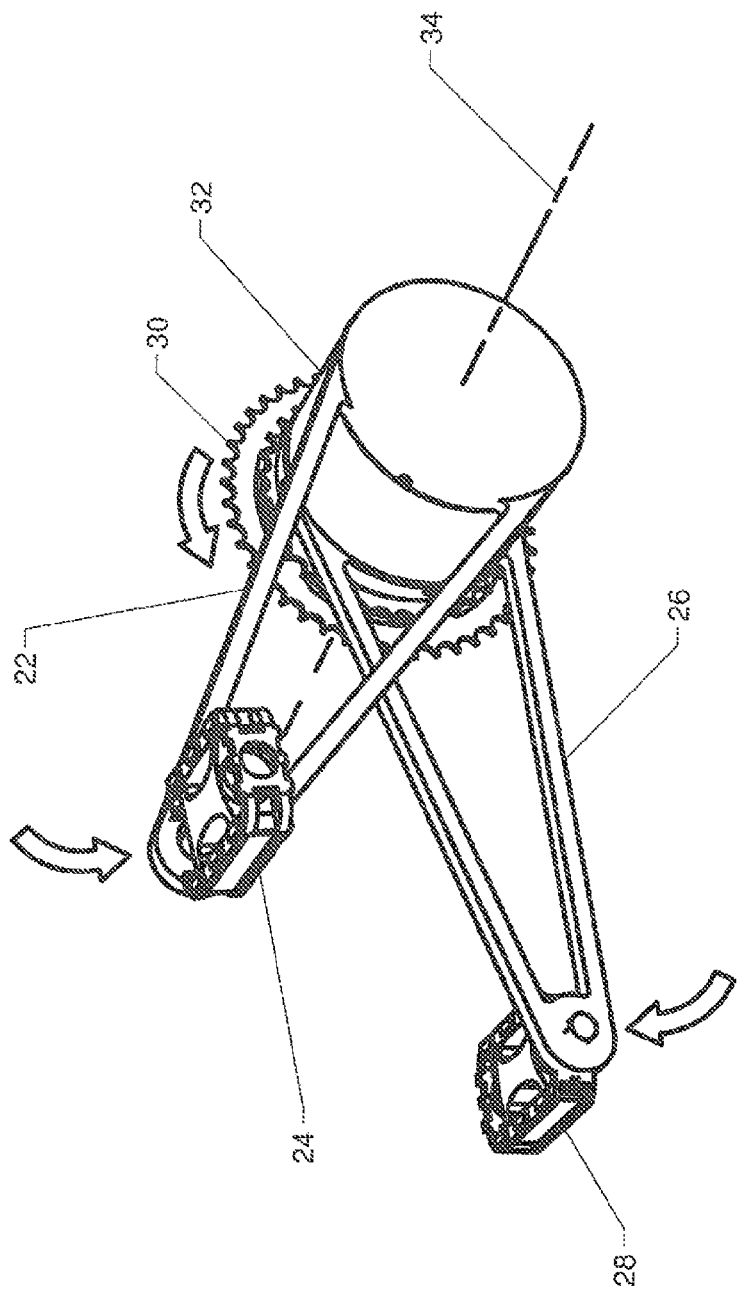
FIG. 4 is a perspective view showing the present invention with the right pedal in the push stroke and the left pedal in the pull stroke.

The inventive transmission converts the reciprocating "treadle" motion into purely rotary motion which can be used to drive a conventional chain-based system in a pedal-powered vehicle. FIGS. 3 and 4 depict the motion of the left and right crank and the driving chain ring. The descriptions will be given in terms of clockwise and counterclockwise motion. Of course, the terms "clockwise" and "counterclockwise" are arbitrary and dependent upon the direction from which a viewer is observing the rotation. A convention is adopted to resolve this ambiguity.

FIG. 3 shows the present invention from the left side of the pedal-powered vehicle. Central axis 34 runs through the center of support housing 32. The convention is therefore from the perspective of a viewer looking along central axis from the left side of the vehicle toward the right side of the vehicle. Using this convention, left crank 22 is being pushed in a counterclockwise direction in FIG. 3 (as indicated by the arrow). Right crank 26 is moving in a clockwise direction.

In the embodiment of FIG. 3, one may say that left pedal 24 is descending while right pedal 28 is ascending. The ascending/descending nomenclature works for many vehicles—but not all. When the inventive transmission is used for a recumbent bicycle, the pedals will be pushed away from the user in a horizontal direction and pulled back in a horizontal direction. Thus, the preferred nomenclature is the established clockwise/counterclockwise convention.

In FIG. 3, the motion of both pedals is converted into counterclockwise motion of chain ring 30. This chain ring motion is conventional in the field of pedal-powered vehicles and allows the present invention to be used with a wide variety of prior art chain-drive mechanisms.

FIG. 4 shows the invention with the two cranks in the opposite configuration. In FIG. 4, left crank 22 is traveling in a counterclockwise direction while right crank 26 is traveling in a clockwise direction. Chain ring 30 is still rotating in a counterclockwise direction. Thus, no matter how the two cranks are moved, the chain ring will always rotate in a counterclockwise direction.

Figure 5:
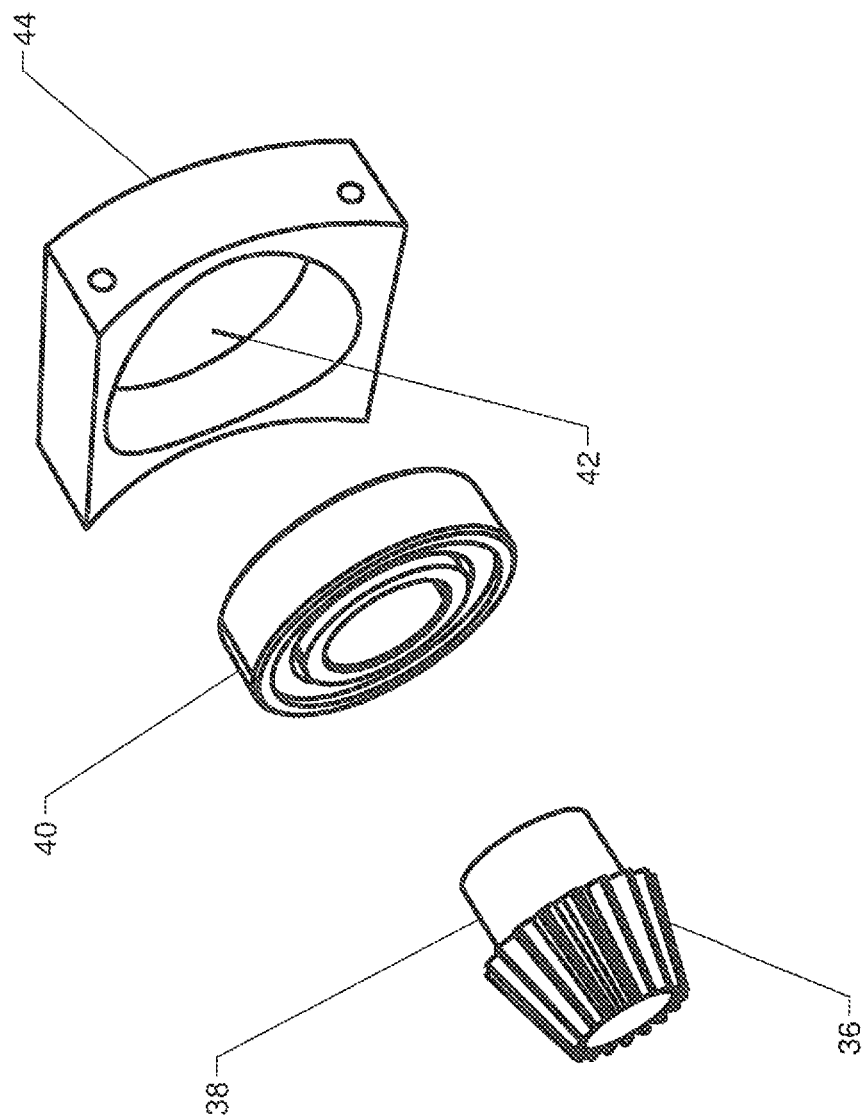
FIG. 5 is an exploded view of a pinion gear assembly.

The details of the transmission contained within the support housing will now be explained. The transmission uses a plurality of reversing gears to ensure that the two cranks always rotate in the opposite direction. These may assume a variety of forms. FIG. 5 shows a preferred embodiment for the reversing gear. Pinion gear 36 is preferably of the beveled type. Shaft 38 is pressed into pinion bearing 40. Pinion bearing 40 is pressed into bearing receiver 42 in pinion block 44.

Figure 6:
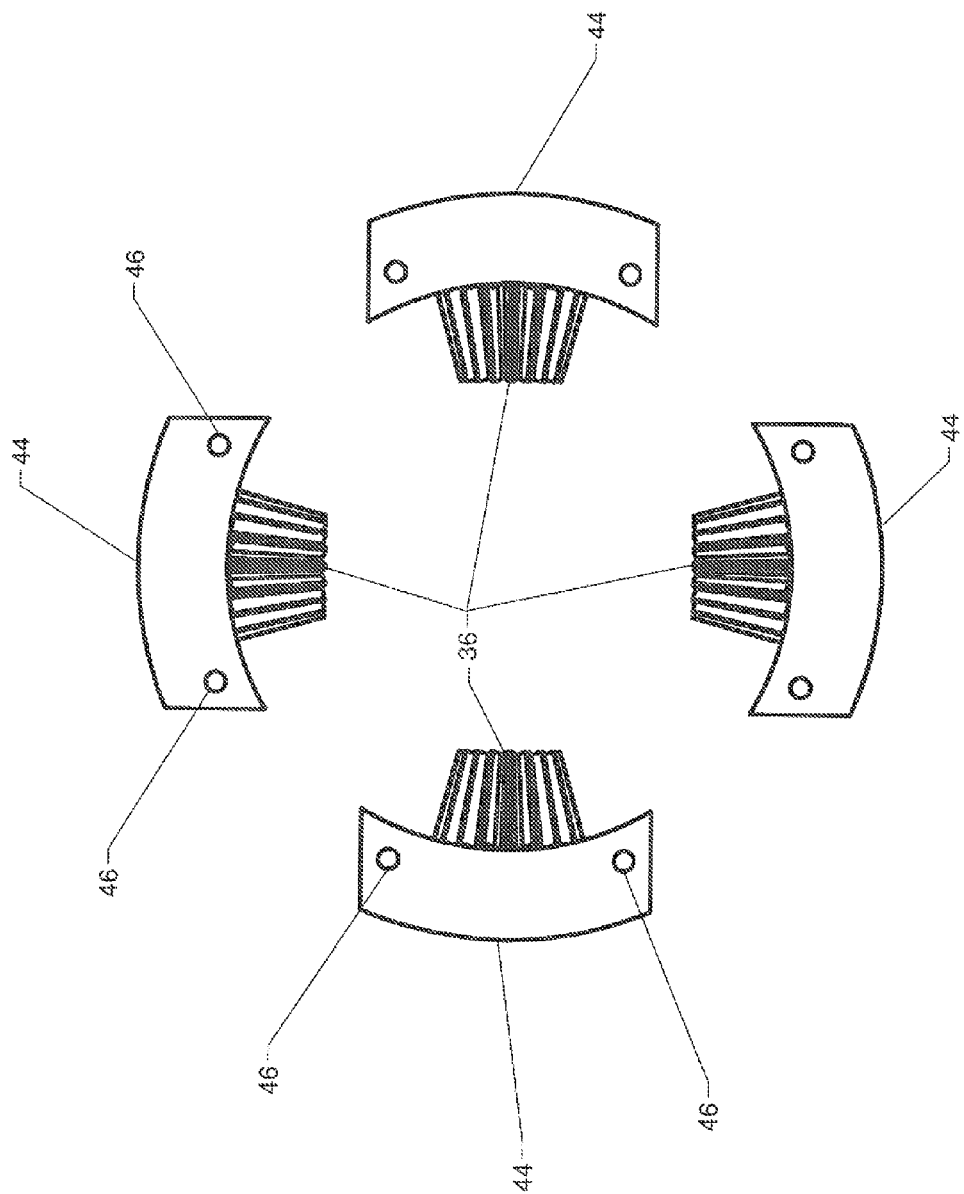
FIG. 6 is an elevation view showing four pinion assemblies arranged as they are used in the present invention.

The invention uses one or more such reversing gear assemblies. The invention preferably uses four such assemblies arranged as shown in FIG. 6. FIG. 6 shows four pinion assemblies arranged at 90 degree intervals in a circular array. Each pinion block is provided with four threaded mounting holes 46. These holes are used to attach the pinion blocks to the inside of support housing 32. In the arrangement shown, the four pinion gears 36 extend inward.

Figure 7:
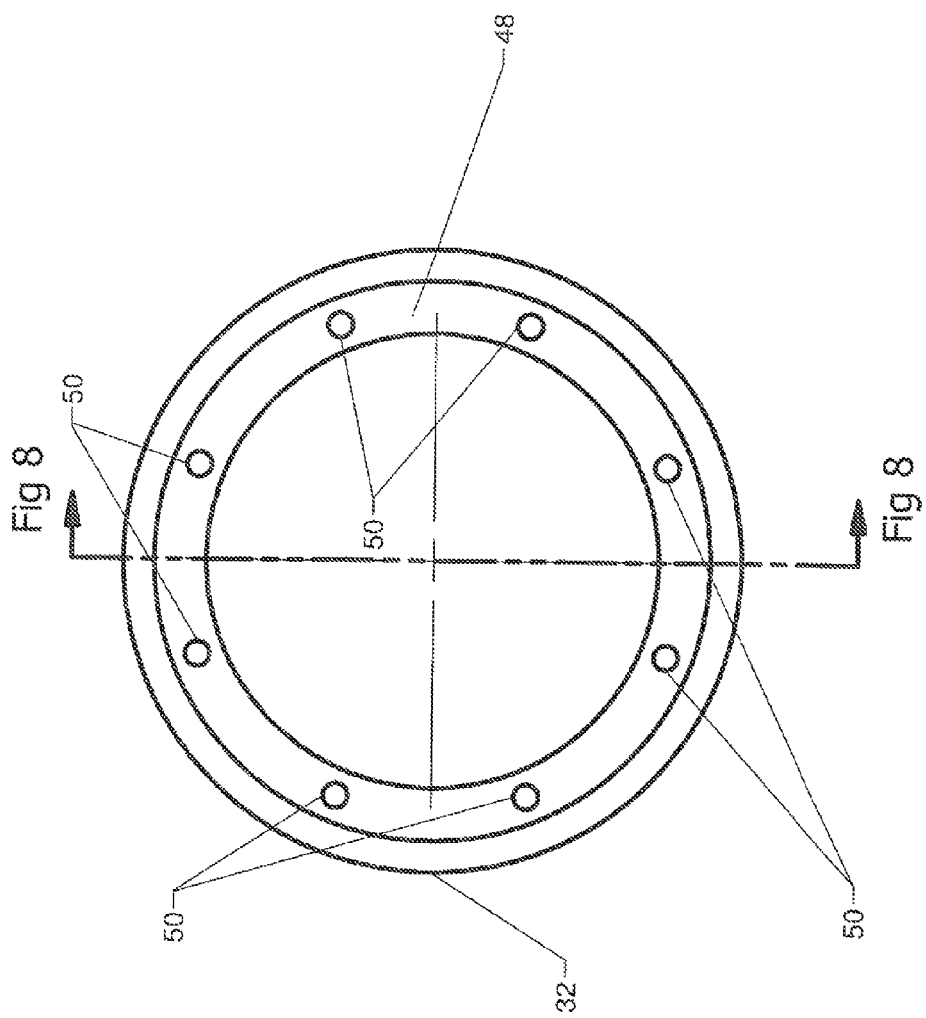
FIG. 7 is an elevation view, showing the support housing used to contain the transmission.
Figure 8:
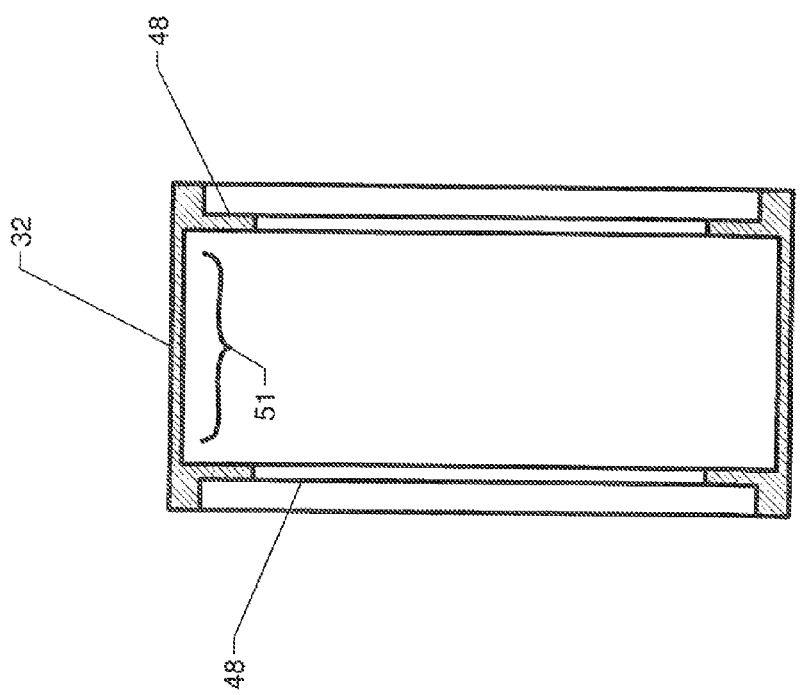
FIG. 8 is a sectional elevation view, showing the support housing.

FIG. 7 shows an elevation view of support housing 32. The reader will observe that mounting flange 48 contains four sets of mounting holes 50. These align with the mounting holes 46 on the four pinion blocks 44 shown in FIG. 6. FIG. 8 shows a sectional elevation view through support housing 32. The two mounting flanges 48 define an annular pocket 51 lying therebetween. This annular pocket accommodates the four pinion blocks.

Figure 9:
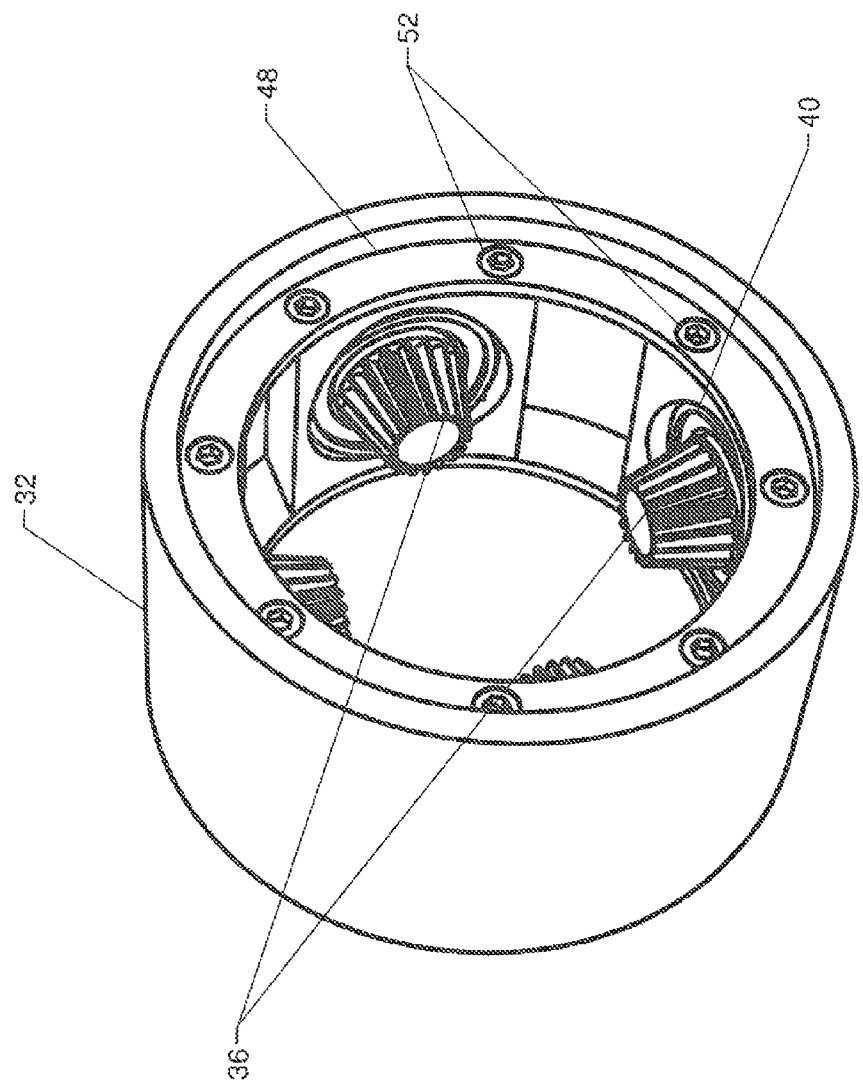
FIG. 9 is a perspective view, showing four pinion gear assemblies installed in the support housing.

FIG. 9 shows support housing 32 with the four reversing gear assemblies installed. Fasteners 52 are threaded through mounting holes 50 in mounting flange 48 and into the mounting holes 46 in the pinion blocks 44. The pinion blocks are thereby rigidly attached to support housing 32. The four pinion gears 36 extend inward as shown.

Both cranks must be engaged with pinion gears 36. Those skilled in the art will realize that there are many different mechanisms which could be used for this purpose. The following descriptions pertain to one of these mechanisms, which should properly be viewed as exemplary and in no way limiting.

Any embodiment used preferably (1) provides an output shaft which ultimately turns in only one direction to provide driving force to the chain; and (2) engages a particular crank with the reversing gears and then to the opposite crank so that the cranks must always move in the opposite direction.

Figure 10:
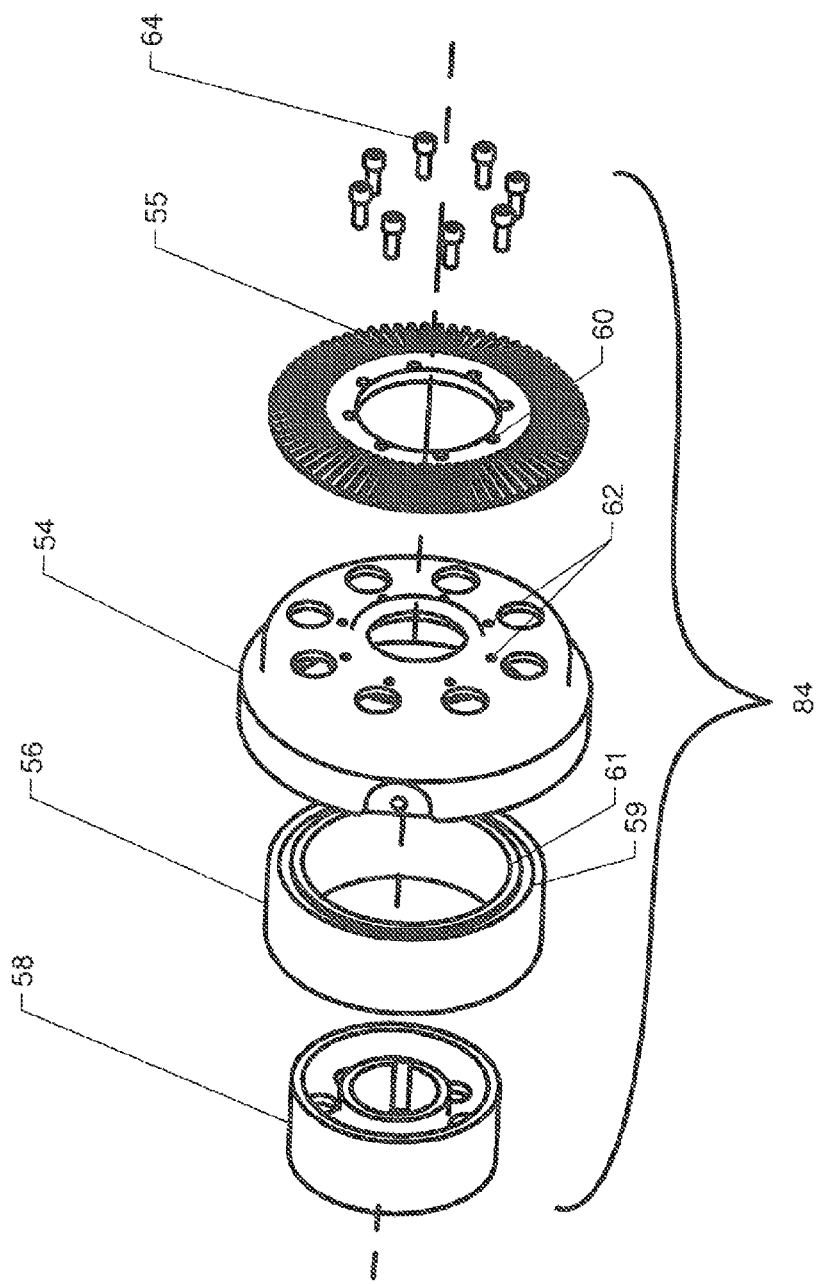
FIG. 10 is an exploded view, showing the components of the right clutch assembly.

The transmission components attached to each crank are mirror images of each other. FIG. 10 shows right clutch assembly 84. Right ring gear 55 is a circular beveled gear configured to engage pinion gears 36. Right ring gear 55 is bolted to right backing hub 54 by passing several fasteners 64 into through holes 60 and threading them into threaded holes 62 in right backing hub.

Right sprag clutch 56 provides a one-way connection between the right crank and the transmission's output shaft. Those skilled in the art will know that a sprag clutch contains a plurality of sprag elements which transmit torque in one direction but not in the other. Such devices are commonly used for starter motor engagement in motorcycles and four-wheelers.

Sprag clutch 56 includes outer sleeve 59 and inner sleeve 61. The two sleeves are selectively linked by the sprag elements lying between them. When outer sleeve 59 is rotated in a counterclockwise direction (using the previously-described directional convention), outer sleeve 59 is locked to inner sleeve 61 and the sprag clutch transmits torque. When outer sleeve 59 is rotated in a clockwise direction, it slips freely over inner sleeve 61 and does not transmit torque:

Right sprag clutch 56 is connected to right backing hub 54—preferably by press-fitting the right sprag clutch into the right backing hub. The reader will note that all the components have a central passage. This passage accommodates a circular shaft which transmits torque out of the transmission to the chain rings. Right sprag spacer 58 is provided to adapt the inner diameter of the right sprag clutch to the outer diameter of the output shaft. Right sprag-spacer 58 is connected to right sprag clutch 56. This is again preferably done by press-fitting right sprag spacer 58 into right sprag clutch 56.

The reader will therefore understand that right backing hub 54 and right ring gear 55 are locked to outer sleeve 59 of right sprag clutch 56. Right sprag spacer 58 is locked to inner sleeve 61 of right sprag clutch 58.

The left clutch assembly includes a mirror image of all these components. An exploded view for the left clutch assembly has therefore not been provided, although this assembly will be explained using sectional elevation views (presented subsequently).

Figure 11:
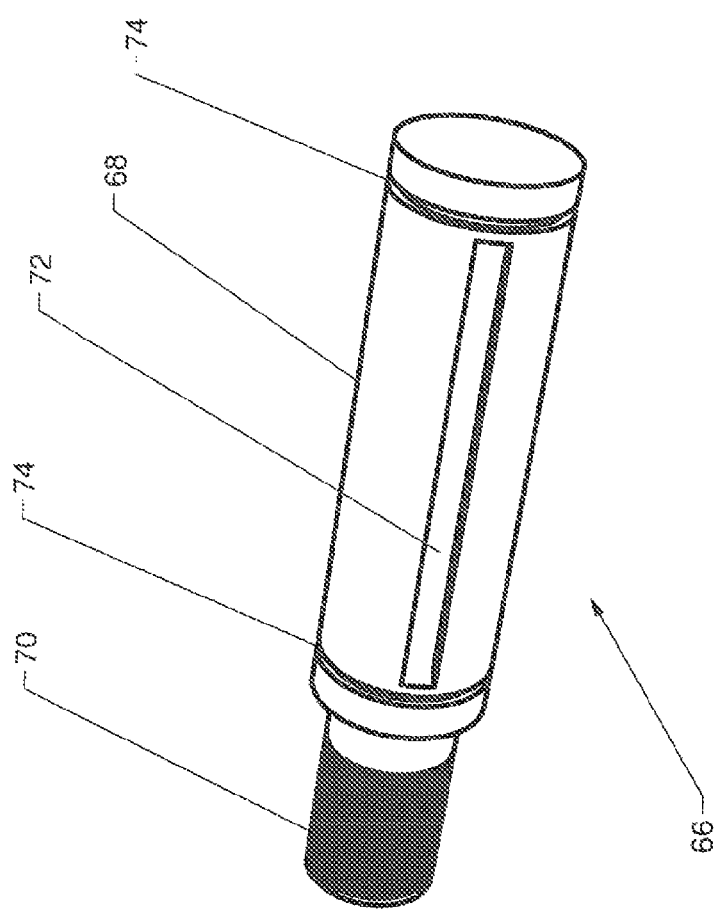
FIG. 11 is a perspective view, showing the drive shaft.

FIG. 11 shows the output shaft which actually carries torque out of the transmission to the chain rings. Shaft 66 includes main journal 68. Threaded shank 70 extends from one end of the shaft. Two snap ring grooves 74 are provided to laterally retain components which are attached to the shaft. A long keyway 72 is provided to attach the right and left sprag spacers to the shaft.

Figure 12:
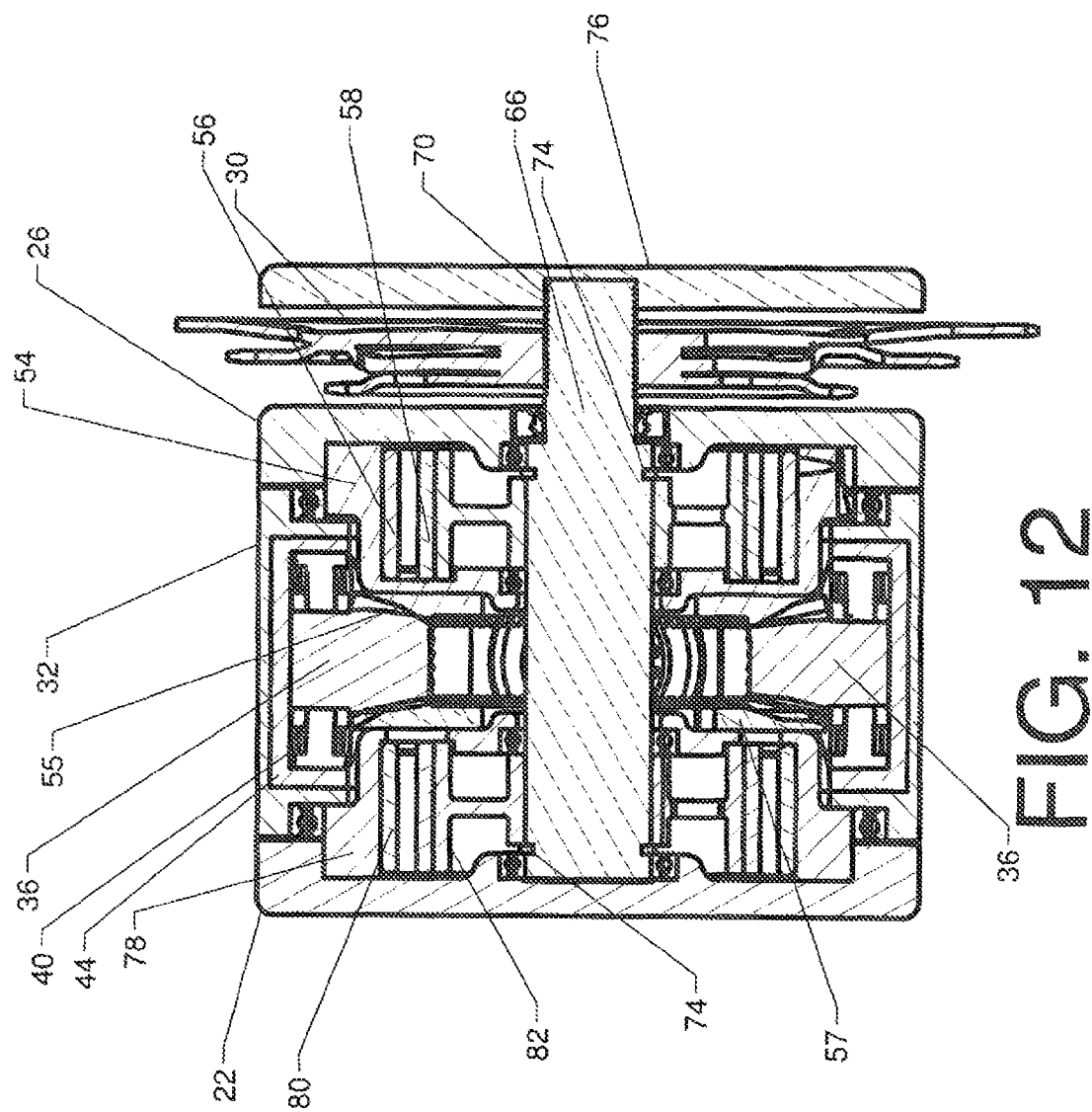
FIG. 12 is a sectional elevation view, showing the completed assembly.
Figure 13:
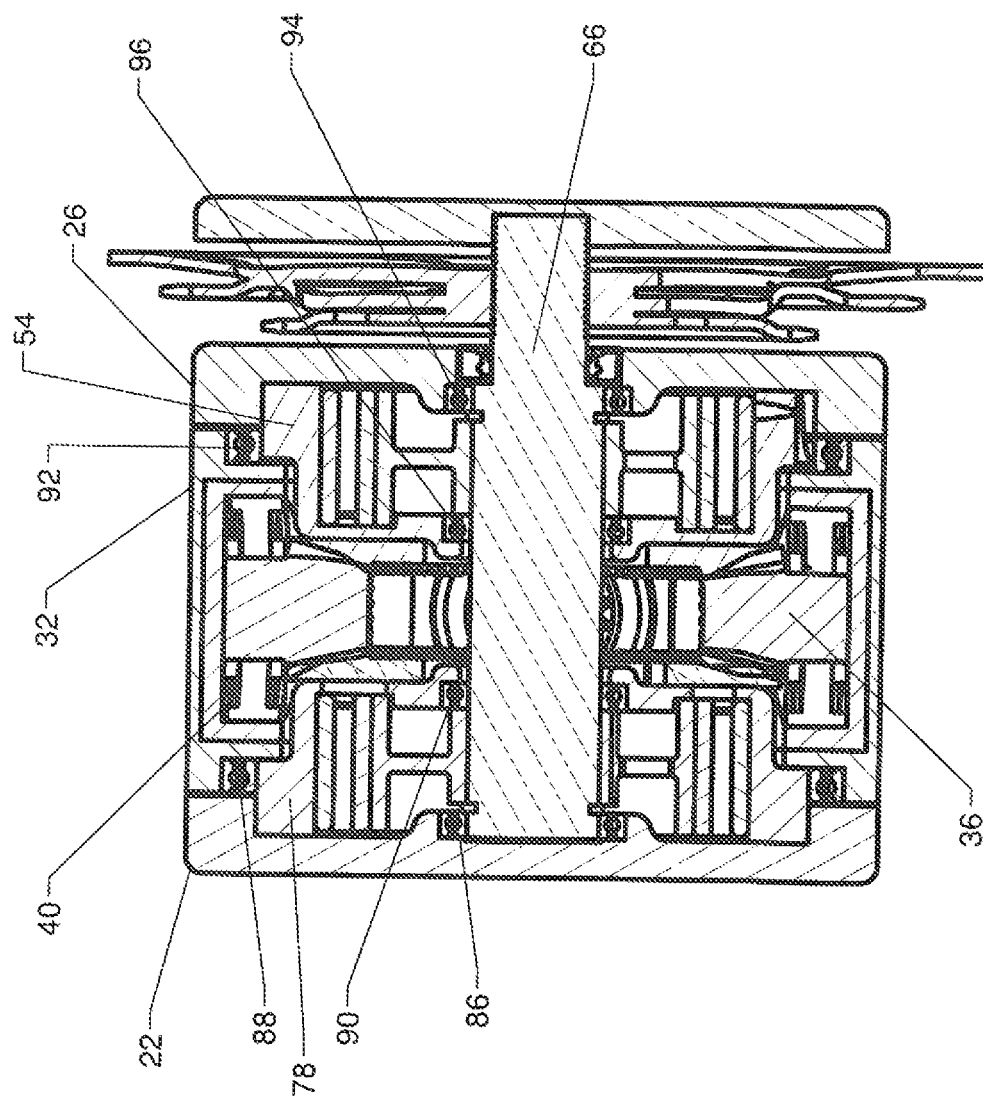
FIG. 13 is a sectional elevation view, showing the completed assembly.

FIGS. 12 and 13 show a sectional elevation view through the assembled transmission. The two views are identical. They are presented separately to allow the labeling of many components without producing visual clutter.

In FIG. 12, support housing 32 mounts the other components. The other components will be explained with respect to their assembly into the support housing, but the reader should bear in mind that the components can be assembled in different ways and in a different order.

As shown in FIG. 9, the assembly process starts by attaching the reversing gear assemblies to support housing 32. Next, the press-fitted assembly of left backing hub 78, left sprag clutch 80, and left sprag spacer 82 is attached to shaft 66 by inserting a key between the left sprag spacer and the shaft (The user will note the presence of a keyway in the identical right sprag spacer 58 in FIG. 10 and the presence of keyway 72 in shaft 66 in FIG. 11). Next, in FIG. 12, a snap ring is snapped into the snap ring groove 74 next to left sprag spacer 82.

Still looking at FIG. 12, the assembly of the left backing hub and the shaft is inserted into support housing 32 from left to right until left ring gear 57 meshes with the pinion gears 36. An assembly of right ring gear 55, right sprag clutch 56, and right sprag spacer 58 is created. This assembly is then slid over the right portion of shaft 66 from right to left in the view. A snap ring is then snapped into the snap ring groove 74 to the right of the pinion gears in the view.

Right crank 26 is connected to right backing hub 54, preferably using one or more radially arrayed bolts. Left crank 22 is connected to left backing hub 78 in the same fashion. Turning briefly back to FIG. 3, the reader will observe the location of radial fasteners 98. These pass inward through the crank hubs and thread into threaded holes in the backing hubs. In the preferred embodiment, four radial fasteners are provided for each crank. This arrangement allows each crank to be removed from its backing hub without disassembling the balance of the transmission Returning now to FIG. 12, the reader will observe that threaded shank 70 extends out the right of the transmission. One or more chain rings 30 are attached to the threaded shank by threading on the chain rings and then nut assembly 76. A variety of existing techniques can be used to attach the chain rings to the output shaft, including keying the chain rings to the shaft. However, the use of a threaded engagement is common in the art and this is the preferred method.

The numerous rotary connections between the components are preferably made using ball bearings. The location of these bearings in the preferred embodiment is indicated in FIG. 13. Left crank is rotatably connected to shaft 66 by left crank bearing 86. Left crank 22 is rotatably connected to support housing 32 by left housing bearing 88. Finally, left backing hub 78 is rotatably connected to shaft 66 by left hub bearing 90.

The same arrangement of bearings is used for the right side of the transmission. Right crank 26 is rotatably connected to shaft 66 by right crank bearing 94. Right crank 26 is rotatably connected to support housing 32 by right housing bearing 92. Finally, right backing hub 54 is rotatably connected to shaft 66 by right hub bearing 96. Wiping seals may be included with each external bearing to prevent the entry of dust and debris.

Returning now to FIG. 12, the operation of the invention will be explained. When left crank 22 is rotated in a counterclockwise direction (meaning that the top of the left crank is moving away from the viewer from the vantage point used in FIG. 12), left sprag clutch 80 is locked and the torque applied to left crank 22 is transmitted through left backing hub 78, left sprag clutch 80, and left sprag spacer 82 to shaft 66.

At the same time, left ring gear 57 engages and spins the four pinion gears 36. The pinion gears are also engaged with right ring gear 55. The spinning pinion gears thereby force right ring gear 55 to rotate in the opposite direction as left ring gear 57 (recall that the position of each pinion gear is fixed with respect to support housing 32). The rotation of the right ring gear causes right crank 26 to rotate in a clockwise direction (meaning that the top of the right crank is moving toward the viewer in the vantage point of FIG. 12). Thus, the pedals are forced, to move in opposite directions.

As right crank 26 is rotating in a clockwise direction, right sprag clutch 56 is unlocked and no torque is transmitted directly from right backing hub 54 to shaft 66. However, if the user pulls upward on right pedal 28 (using a toe clip, for example), the clockwise force transmitted via right crank 26 is still used to power the transmission. It does not pass through right sprag clutch 56. Rather, it passes through the pinion gears—where its direction is reversed—and then through left sprag clutch 80. The two pedals are traveling in opposite directions, but both may be used to produce driving torque.

The operation of the components is reversed when right crank 26 is moved in a counterclockwise direction. In that direction right sprag clutch 56 is locked. Torque is then transmitted from right crank 26 to right backing hub 54, right sprag clutch 56, right ring spacer 58, and then to shaft 66. Right ring gear 55 also spins the pinion gears 36. This motion causes left ring gear 57 to rotate in a clockwise direction. Left crank 22 is also forced to rotate in a clockwise direction. Left sprag clutch 80 is unlocked in this direction and transmits no torque. However, if the user pulls on the left pedal (again using a toe clip or similar device) the torque is transmitted from left ring gear 57 through the pinion gears and to right ring gear 55. Thus, this pulling force is transmitted to the shaft.

The reader will therefore appreciate that although the motion of the two cranks is always forced to be opposite, torque may be added using either crank at any time. In addition, there is no set point where the user must reverse the motion of the pedals. Instead, the user can control this with his or her feet. Whenever the user reverses the motion of the feet, the path of force transmitted through the transmission will switch (one of the clutches will unlock and the other will lock). The user may choose to move the feet through a large arc of travel, a small arc of travel, or anything in between. In addition, the user can vary the amount of travel at will.

The "crossing point" of the two cranks (the point where they are pointed in exactly the same direction even though they are traveling in opposite directions) is fixed according to the assembly of the transmission. However, it can be easily changed by disassembling one of the two clutch assemblies and indexing one of the ring gears one tooth over with respect to the engagement of the pinion gears. Thus, it is fairly easy to change the neutral or crossing point if this is desired by a particular user.

The preceding description contains significant detail regarding the novel aspects of the present invention. It is should not be construed, however, as limiting the scope of the invention but rather as providing illustrations of the preferred embodiments of the invention. Thus, the scope of the invention should be fixed by the claims presented, rather than by the examples given.

Having described my invention, I claim:

1. A transmission for a lever-powered vehicle, comprising:
   a. a right crank;
   b. a left crank;
   c. a rotating shaft;
   d. a left one-way clutch, said left one-way clutch locking said left crank to said rotating shaft when said left crank is rotated in a counter-clockwise direction, and unlocking when said left crank is rotated in a clockwise direction;
   e. a right one-way clutch, said right one-way clutch locking said right crank to said rotating shaft when said right crank is rotated in a counter-clockwise direction, and unlocking when said right crank is rotated in a clockwise direction;
   f. a right ring gear attached to said right crank;
   g. a left ring gear attached to said left crank; and
   h. a plurality of reversing gears continuously meshing with said right ring gear and said left ring gear, whereby said plurality of reversing gears force said right and left ring gears to rotate in opposite directions so that torque applied to said right crank at a time said right one-way clutch is in an unlocked state will be transferred through said reversing gears to said left ring gear, and thence through said left one-way clutch to said rotating shaft.

2. A transmission for a lever-powered vehicle as recited in claim 1, further comprising:
   a. a support housing;
   b. wherein each of said reversing gears is attached to a pinion block; and
   c. wherein each pinion block is attached to said support housing.

3. A transmission for a lever-powered vehicle as recited in claim 2, wherein:
   a. said right crank is rotatably attached to said support housing; and
   b. said left crank is rotatably attached to said support housing.

4. A transmission for a lever-powered vehicle as recited in claim 2, wherein said plurality of reversing gears comprises four reversing gears spaced at ninety degree intervals around said support housing.

5. A transmission for a lever-powered vehicle as recited in claim 1, further comprising at least one chain ring attached to said rotating shaft.

6. A transmission for a lever-powered vehicle as recited in claim 1, wherein said right one-way clutch and said left one-way clutch are both sprag clutches.

7. A transmission for a lever-powered vehicle as recited in claim 2, wherein said plurality of reversing gears comprises two reversing gears spaced at 180 degree intervals around said support housing.

8. A transmission for a lever-powered vehicle, comprising:
   a. a support housing;
   b. a left crank rotatably attached to said support housing;
   c. a right crank rotatably attached to said support housing;
   d. a left one-way clutch, rotatably attached to said left crank;
   e. a right one-way clutch, rotatably attached to said right crank;
   f. a rotating shaft, rotatably attached to said left one-way clutch and said right one-way clutch;
   g. said left one-way clutch locking said left crank to said rotating shaft when said left crank is rotated in a counter-clockwise direction, and unlocking when said left crank is rotated in a clockwise direction;
   h. said right one-way clutch locking said right crank to said rotating shaft when said right crank is rotated in a counter-clockwise direction, and unlocking when said right crank is rotated in a clockwise direction; and i. a plurality of reversing gears continuously and reversibly connecting said left crank to said right crank, whereby said plurality of reversing gears force said left and right cranks to rotate in opposite directions so that torque applied to said right crank at a time said right one-way clutch is in an unlocked state will be transferred through said reversing gears and thence through said left one-way clutch to said rotating shaft.

9. A transmission for a lever-powered vehicle as recited in claim 8, further comprising:
   a. wherein each of said reversing gears is attached to a pinion block; and
   b. wherein each pinion block is attached to said support housing.

10. A transmission for a lever-powered vehicle as recited in claim 9, wherein:
    a. said right crank is rotatably attached to said support housing by a right housing bearing; and
    b. said left crank is rotatably attached to said support housing by a left housing bearing.

11. A transmission for a lever-powered vehicle as recited in claim 9, wherein said plurality of reversing gears comprises four reversing gears spaced at ninety degree intervals around said support housing.

12. A transmission for a lever-powered vehicle as recited in claim 8, further comprising at least one chain ring attached to said rotating shaft.

13. A transmission for a lever-powered vehicle as recited in claim 8, wherein said right one-way clutch and said left one-way clutch are both sprag clutches.

14. A transmission for a lever-powered vehicle as recited in claim 8, wherein said plurality of reversing gears comprises two reversing gears spaced at 180 degree intervals around said support housing.

15. A transmission for a lever-powered vehicle, comprising:
    a. a support housing;
    b. a left crank rotatably attached to said support housing, said left crank including a left beveled ring gear;
    c. a right crank rotatably attached to said support housing, said right crank including a right beveled ring gear;
    d. a left one-way clutch, rotatably attached to said left crank;
    e. a right one-way clutch, rotatably attached to said right crank;
    f. a rotating shaft, rotatably attached to said left one-way clutch and said right one-way clutch;
    g. said left one-way clutch locking said left crank to said rotating shaft when said left crank is rotated in a counter-clockwise direction, and unlocking when said left crank is rotated in a clockwise direction;
    h. said right one-way clutch locking said right crank to said rotating shaft when said right crank is rotated in a counter-clockwise direction, and unlocking when said right crank is rotated in a clockwise direction;
    i. a plurality of reversing gears mounted to said support housing; and
    j. said plurality of reversing gears meshing with said right beveled ring gear and said left beveled ring gear, whereby said plurality of reversing gears force said right and left beveled ring gears to rotate in opposite directions.

16. A transmission for a lever-powered vehicle as recited in claim 15, further comprising:
    a. wherein each of said reversing gears is attached to a pinion block; and
    b. wherein each pinion block is attached to said support housing.

17. A transmission for a lever-powered vehicle as recited in claim 16, wherein:
    a. said right crank is rotatably attached to said support housing by a right housing bearing; and
    b. said left crank is rotatably attached to said support housing by a left housing bearing.

18. A transmission for a lever-powered vehicle as recited in claim 16, wherein said plurality of reversing gears comprises four reversing gears spaced at ninety degree intervals around said support housing.

19. A transmission for a lever-powered vehicle as recited in claim 15, further comprising at least one chain ring attached to said rotating shaft.

20. A transmission for a lever-powered vehicle as recited in claim 15, wherein said right one-way clutch ad said left one-way clutch are both sprag clutches.

\* \* \* \* \*